United States Patent [19]

Hille et al.

[11] Patent Number: 5,066,759

[45] Date of Patent: Nov. 19, 1991

[54] PROCESS FOR THE PREPARATION OF MACROMONOMERS AND MACROMONOMERS PREPARED BY THIS PROCESS

[75] Inventors: Hans-Dieter Hille, Bergisch Gladbach; Arnold Dobbelstein, Munster, both of Fed. Rep. of Germany

[73] Assignee: BASF Lacke & Farben AG, Munster-Hiltrup, Fed. Rep. of Germany

[21] Appl. No.: 466,438

[22] PCT Filed: Oct. 27, 1988

[86] PCT No.: PCT/EP88/00969

§ 371 Date: Jun. 13, 1990

§ 102(e) Date: Jun. 13, 1990

[87] PCT Pub. No.: WO89/04333

PCT Pub. Date: May 18, 1989

[30] Foreign Application Priority Data

Nov. 10, 1987 [DE] Fed. Rep. of Germany ....... 3738079

[51] Int. Cl.$^5$ .............................................. C08G 18/10
[52] U.S. Cl. ....................................... 528/60; 528/69; 528/76; 528/80; 528/83; 528/85
[58] Field of Search ................... 528/60, 69, 76, 80, 528/83, 85

[56] References Cited

FOREIGN PATENT DOCUMENTS 0043966 1/1982 European Pat. Off. .
0084670 12/1982 European Pat. Off. .
0165849 5/1985 European Pat. Off. .
2637690 2/1978 Fed. Rep. of Germany .

Primary Examiner—Maurice J. Welsh
Attorney, Agent, or Firm—Kenyon & Kenyon

[57] ABSTRACT

The invention relates to a process for the preparation of macromonomers which carry at least two hydroxyl groups at one end. The process comprises (1) reacting a polyester, polyether, polyurethane, polyurea or polyamide prepolymer which has a number average molecular weight of 300 to 3000, preferably 500 to 2000, and contains an average of one terminal hydroxyl or amino group and at least one carboxyl group per molecule with a diisocyanate to form an intermediate which contains an average of one terminal isocyanate group and at least one carboxyl group per molecule, and subsequently reacting this intermediate (2) with a compound which has a molecular weight of 90 to 800, preferably 120 to 300, and contains at least two hydroxyl groups in addition to a group which is reactive to isocyanate groups, to form a macromonomer which carries an average of at least one carboxyl group and, at one end, at least two hydroxyl groups per molecule.

15 Claims, No Drawings

PROCESS FOR THE PREPARATION OF MACROMONOMERS AND MACROMONOMERS PREPARED BY THIS PROCESS

The invention relates to a process for the preparation of macromonomers which carry at least two hydroxyl groups at one end.

Macromonomers are taken to mean relatively short-chain polymers or oligomers which contain, at one end, functional groups which are capable of polymerization, polyaddition or polycondensation.

Macromonomers are used, in particular, for the preparation of graft copolymers. It is known that polyethers which carry two hydroxyl groups at one end can be employed as macromonomers. Such polyethers are prepared by initiating the polymerization of alkylene oxides using an acetal or ketal which contains a H-acidic group in addition to the acetal or ketal group. After blocking the terminal hydroxyl groups, polyether-1,2- or -1,3-diols are obtained from the resultant reaction products by elimination of the acetal or ketal group (cf., for example, German Offenlegungsschrift 3,025,807).

The above-described process for the preparation of polyethers which can be employed as macromonomers is associated with relatively high costs and is only suitable for the preparation of macromonomers based on polyalkylene oxides.

It would be desirable to have available carboxyl group-carrying macromonomers for the preparation of water-diluteable polymers.

The object of the present invention is to provide a novel process for the preparation of macromonomers which carry an average of at least one carboxyl group and, at one end, at least two hydroxyl groups per molecule.

This object is achieved by a process which comprises
(1) reacting a polyester, polyether, polyurethane, polyurea or polyamide prepolymer which has a number average molecular weight of 300 to 3000, preferably 500 to 2000, and contains an average of one terminal hydroxyl or amino group and at least one carboxyl group per molecule with a diisocyanate to form an intermediate containing an average of one terminal isocyanate group and at least one carboxyl group per molecule, and subsequently reacting this intermediate
(2) with a compound which has a molecular weight of 90 to 800, preferably 120 to 300, and contains at least two hydroxyl groups in addition to a group which is reactive to isocyanate groups, to form a macromonomer which carries an average of at least one carboxyl group and, at one end, at least two hydroxyl groups per molecule.

The advantages achieved by the invention are essentially that the process according to the invention makes possible the preparation of carboxyl group-carrying macromonomers in a simple manner and that the process according to the invention can be carried out at relatively low expense with a very wide variety of readily accessible prepolymers.

The process according to the invention is a two-step process. In the first step, a polyester, polyether, polyurethane, polyurea or polyamide prepolymer which has a number average molecular weight of 300 to 3000, preferably 500 to 2000, and contains an average of one terminal hydroxyl or amino group and at least one carboxyl group per molecule is reacted with a diisocyanate to form an intermediate containing an average of one terminal isocyanate group and at least one carboxyl group per molecule.

Polyesters which are suitable as prepolymers can be obtained, for example, by polycondensing dialcohols and dicarboxylic acids or reactive dialcohol or dicarboxylic acid derivatives (such as, for example, dicarboxylic anhydrides) by methods which are generally well-known, the dialcohol component and the dicarboxylic acid component being employed in a molar ratio of 1:1 and the polycondensation reaction being terminated when the molecular weight desired is reached. In order to determine the molecular weight of a polyester, simple determination of the acid number is sufficient. The molecular weight can be calculated using the formula $$M = \frac{56,100}{AN}$$

($M$ = number average molecular weight, $AN$ = acid number). The polycondensation reaction can be terminated, for example, by cooling the reaction batch.

Aliphatic, cycloaliphatic (saturated or unsaturated) and/or aromatic dicarboxylic acids preferably having 2 to 14, particularly preferably 4 to 12, carbon atoms per molecule or the esterification-capable derivatives thereof (for example anhydrides or esters), for example phthalic acid, isophthalic acid, terephthalic acid, tetrahydro- and hexahydrophthalic anhydride, endomethylenetetrahydrophthalic acid, succinic acid, glutaric acid, sebacic acid, azelaic acid, fumaric acid and maleic acid, can be employed for the preparation of polyester prepolymers.

Aliphatic, cycloaliphatic and/or araliphatic dialcohols preferably having 2 to 15, particularly preferably 2 to 6, carbon atoms, such as, for example, glycols, such as ethylene glycol, propanediol, butanediol, 2-ethyl-1,3-propanediol, 2-ethyl-1,3-hexanediol, neopentyl glycol, 2,2-trimethyl-1,3-pentanediol, 1,6-hexanediol, 1,2- and 1,4-cyclohexanediol, 1,2- and 1,4-bis-(hydroxymethyl)-cyclohexane, bis-(ethylene glycol) adipate, ether alcohols such as di- and triethylene glycol and dipropylene glycol, can be employed for the preparation of the polyester prepolymers.

Polyesters which are suitable as prepolymers can also be obtained by self-condensation of hydroxycarboxylic acids, preferably hydroxystearic acid.

A further important method of preparing suitable polyester prepolymers is to react a polyester containing an average of two terminal hydroxyl groups per molecule (known as polyester diol below) with a (preferably cyclic) polycarboxylic anhydride, preferably a cyclic dicarboxylic anhydride, at reaction temperatures not exceeding 80° C., in a stoichiometric ratio such that polyester prepolymers are produced and which contain an average of one terminal hydroxyl group and at least one, preferably only one, carboxyl group per molecule.

The polyester diols used can be synthesized from the dicarboxylic acid and dialcohol components already described in detail above.

The polyester diols are preferably reacted with a cyclic dicarboxylic anhydride. The reaction with carboxylic anhydrides, which result in prepolymers containing more than one carboxyl group, is less preferred.

In the reaction of the polyester diol with the polycarboxylic anhydride, the stoichiometric ratios between polyester diol and polycarboxylic anhydride are selected (in general one mole of polycarboxylic anhydride are employed per mole of polyester diol) so that an average of only one hydroxyl group is esterified per polyester diol molecule. The reaction between polyester diol and polycarboxylic anhydride is preferably carried out in an organic solvent, such as, for example, methyl ethyl ketone or acetone.

It is of course also possible to employ polyester prepolymers which also contain ether and/or urethane and/or urea and/or amide bonds in addition to ester bonds in the polymer chain.

Particularly preferred polyester prepolymers are the prepolymers which can be obtained as described above by reacting a polyester diol with tetrahydrophthalic anhydride.

Polyethers which are suitable as prepolymers can be obtained by reacting polyether polyols, preferably polyether diols, with a (preferably cyclic) polycarboxylic anhydride, preferably with a cyclic dicarboxylic anhydride, but particularly preferably with tetrahydrophthalic anhydride, in stoichiometric ratios such that polyether prepolymers are produced which contain an average of one terminal hydroxyl group and at least one, preferably only one, carboxyl group per molecule.

Examples which may be mentioned of suitable polyether diols which are suitable for the preparation of the polyether prepolymers are poly(ethylene oxide) glycol, poly(propylene oxide) glycol, poly(butylene oxide) glycol and poly(oxtetramethylene) glycol.

It is of course also possible to employ polyether prepolymers which also contain ester and/or urethane and/or urea and/or amide bonds in addition to ether bonds in the polymer chain.

Suitable polyurethane or polyurea prepolymers can be obtained, for example, by reacting hydroxyl or amino group-containing polyurethanes or polyureas, preferably polyurethanes or polyureas containing two terminal hydroxyl or two terminal amino groups, with a (preferably cyclic) polycarboxylic anhydride, preferably a cyclic dicarboxylic anhydride, particularly preferably tetrahydrophthalic anhydride, to form prepolymers which contain an average of one terminal hydroxyl or amino group and at least one, preferably only one, carboxyl group per molecule.

Polyurethanes or polyureas which contain two terminal hydroxyl or two terminal amino groups per molecule can be prepared by methods which are generally well-known by reacting appropriate stoichiometric amounts of diisocyanate and dihydroxyl or diamino compounds.

Aliphatic, cycloaliphatic, araliphatic and aromatic diisocyanates, preferably containing 4 to 25, particularly preferably 4 to 16, carbon atoms, can be used for the preparation of the hydroxyl or amino group-containing polyurethanes or polyureas. Examples which may be mentioned are: isophorone diisocyanate, trimethylene diisocyanate, tetramethylene diisocyanate, pentamethylene diisocyanate, hexamethylene diisocyanate, ethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)methane, bis-(4-isocyanatophenyl)methane, 4,4'-diisocyanatodiphenyl ether and 2,3-bis-(8-isocyanatooctyl)-4-octyl-5-hexylcyclohexene.

Dihydroxyl or diamino compounds which are suitable for the preparation of the hydroxyl or amino group-containing polyurethanes or polyureas are, for example, aliphatic, cycloaliphatic and/or araliphatic dialcohols or diamino compounds having 2 to 15, preferably 2 to 6, carbon atoms, such as, for example, glycols, such as ethylene glycol, propanediol, butanediol, 2-ethyl-1,3-propanediol, 2-ethyl-1,3-hexanediol, neopentyl glycol, 2,2-trimethyl-1,3-pentanediol, hexanediol, cyclohexanediol, 1,4-bis-(hydroxymethyl)cyclohexane, bis-(ethylene glycol) adipate, ether alcohols such as di- and triethylene glycol and dipropylene glycol, ethylenediamine, 1,2- or 1,3-propylenediamine, 1,6-hexanediamine, 2-methyl-1,6-hexanediamine, 1-methyl-2,4-diaminocyclohexane, 1,3- or 1,4-bis-(aminomethyl)cyclohexane, 4,4'-diaminodicyclohexylmethane or similar diamines which are known per se.

It is of course also possible to employ polyurethane or polyurea prepolymers which also contain ester and/or ether and/or urethane and/or urea and/or amide bonds in addition to urethane or urea bonds in the polymer chain.

Polyamides which are suitable as prepolymers can be obtained, for example, by polycondensing diamines and dicarboxylic acids or reactive dicarboxylic acid derivatives by methods which are generally well-known, the diamines and the dicarboxylic acids being employed in the molar ratio 1:1, and the polycondensation reaction being terminated when the molecular weight desired is reached. In this way, polyamide prepolymers are obtained which contain an average of one terminal amino group and one carboxyl group per molecule.

Polyamides which are suitable as prepolymers can also be obtained by reacting polyamides containing terminal amino groups with a (preferably cyclic) polycarboxylic anhydride, preferably with a cyclic dicarboxylic anhydride, particularly preferably with tetrahydrophthalic anhydride, in stoichiometric ratios such that polyamide prepolymers are produced which contain an average of one terminal amino group and at least one, preferably only one, carboxyl group per molecule.

It is of course also possible to employ polyamide prepolymers which also contain ester and/or ether and/or urethane and/or urea bonds in addition to the amide bonds in the polymer chain.

Besides the carboxyl and/or hydroxyl or amino groups, the prepolymers used according to the invention must not contain any functional groups which are reactive to NCO groups under the reaction conditions used for the preparation of the macromonomers according to the invention.

The process according to the invention is preferably carried out using polyester prepolymers. The process according to the invention is very particularly preferably carried out using polyester prepolymers which can be obtained by reacting a polyester diol with tetrahydrophthalic anhydride.

In the first step of the preparation of the macromonomers according to the invention, one of the above-described prepolymers is reacted with a diisocyanate to give an intermediate containing an average of one terminal isocyanate group and at least one carboxyl group per molecule.

Diisocyanate and prepolymer are preferably reacted in a molar ratio of 1:1 to prepare the intermediates desired.

The reaction between diisocyanate and prepolymer must be directed so that, as far as possible, all the hydroxyl or amino groups or the majority of the hydroxyl or amino groups and, as far as possible, no hydroxyl group or only a very small number of carboxyl groups react with isocyanate groups. This can be achieved, for example, by employing prepolymers which contain carboxyl groups which are as unreactive as possible to NCO groups and contain hydroxyl or amino groups which are as reactive as possible to NCO groups. As is known, the following reactivity series can generally be assumed with regard to the reactivity to NCO groups bound to (cyclo)aliphatic molecular fragments:

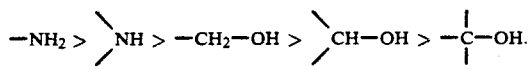

Sterically hindered carboxyl groups may be mentioned as an example of unreactive carboxyl groups. In addition, the reactivity of carboxyl groups can be reduced by salt formation. Further measures for controlling the reaction in the desired direction comprise the choice of reaction temperature and the choice of reaction time. As a rule of thumb, it can be stated that the reaction temperature must be reduced and the reaction time shortened as the reactivity difference between carboxyl groups and hydroxyl or amino groups becomes less. The reaction between prepolymer and diisocyanate is preferably catalyzed by well-known methods of polyurethane chemistry and is preferably carried out in organic solvents, such as, for example, methyl ethyl ketone and acetone.

The diisocyanates used are preferably diisocyanates in which the isocyanate groups are bound to (cyclo)aliphatic molecular fragments. Diisocyanates in which the isocyanate groups are bound to aromatic molecular fragments are only suitable in exceptional cases due to their high reactivity. The diisocyanates employed preferably contain 4 to 25, particularly preferably 4 to 16, carbon atoms per molecule.

The examples of suitable diisocyanates which may be mentioned are: ethylene diisocyanate, tetramethylene diisocyanate, hexamethylene diisocyanate, trimethylhexamethylene diisocyanate, dodecane diisocyanate, diisocyanatodipropyl ether, cyclohexane diisocyanate, diisocyanatomethylcyclohexane, isophorone diisocyanate and dicyclohexylmethane diisocyanate.

Diisocyanates which are preferably employed are isophorone diisocyanate, dicyclohexylmethane diisocyanate, hexamethylene diisocyanate and tetramethylxylene diisocyanate. Isophorone diisocyanate is particularly preferably employed.

Particularly preferred intermediates are obtained when a polyester prepolymer which contains a primary hydroxyl group and a terminal hydroxyl group originating from tetrahydrophthalic acid is reacted with (cyclo)aliphatic diisocyanate, preferably isophorone diisocyanate, in an organic solvent, preferably methyl ether ketone or acetone, at reaction temperatures lower than 80° C. until the theoretically calculated NCO content is reached.

In the second step of the preparation of the macromonomers according to the invention, the intermediate prepared in the first step is reacted with a compound which has a molecular weight of 90 to 800, preferably 120 to 300, and, besides a group which is reactive to isocyanate groups, contains at least two hydroxyl groups (known as the polyol component below), in stoichiometric amounts (1 mole of the polyol component are generally employed per NCO equivalent) such that macromonomers are obtained which carry an average of at least one carboxyl group, preferably only one carboxyl group, and, at one end, at least two hydroxyl groups per molecule.

Polyol components which can be employed are polyols and polyols which contain an amino group in addition to the hydroxyl groups, and polyols which contain a mercapto group in addition to the hydroxyl groups. Polyols and polyols which contain an amino group in addition to the hydroxyl groups are preferably employed. Examples which may be mentioned of polyol components which can be employed are triols, tetraols, trimethylolethane, trimethylolpropane, ditrimethylolpropane, glycerol, triethanolamine, diethanolamine, 2-amino-2-methyl-1,3-propanediol, 2-amino-2-hydroxymethylpropanediol and 2-amino-2-ethyl-1,3-propanediol. It is of course also possible to employ the polyols in the form of their acetals or ketals. When the reaction is complete, the acetal or ketal structures which are still retained are eliminated by the action of acids.

Particularly preferred polyol components are trimethylolpropane and ditrimethylolpropane.

The reaction of the polyol component with the intermediate is expediently carried out in an inert organic solvent (for example methyl ethyl ketone or acetone) at temperatures from room temperature to about 90° C., and can also be catalyzed by methods which are generally well-known. In this reaction too, it must be carefully ensured that only slight reactions between the —NCO and —COOH groups or none at all, occur. This can be achieved, for example, by employing polyol components containing an amino, mercapto or hydroxyl group which is particularly reactive to —NCO groups. Further measures for controlling the reaction in the desired direction comprise the choice of reaction temperature and the choice of reaction time. As a rule of thumb, it can be stated that the reaction temperature must be reduced and the reaction time shortened as the reactivity difference between carboxyl groups and amino, mercapto or hydroxyl groups becomes less.

A preferred embodiment of the second preparation step comprises initially introducing the polyol component and slowly adding the intermediate.

The invention also relates to novel macromonomers. The macromonomers according to the invention are distinguished in that they can be obtained by (1) reacting a polyester, polyether, polyurethane, polyurea or polyamide prepolymer which has a number average molecular weight of 300 to 3000, preferably 500 to 2000, and contains an average of one terminal hydroxyl or amino group and at least one carboxyl group per molecule with a diisocyanate to form an intermediate which contains an average of one terminal isocyanate group and at least one carboxyl group per molecule, and subsequently reacting this intermediate (2) with a compound which has a molecular weight of 90 to 800, preferably 120 to 300, and contains at least two hydroxyl groups in addition to the group which is reactive to isocyanate groups, to form a macromonomer which carries an average of at least one carboxyl group and, at one end, at least two hydroxyl groups per molecule.

The macromonomers according to the invention have, in particular, the advantages that they carry at least one carboxyl group in addition to the hydroxyl groups, can be prepared in a simple manner, and are highly suitable for the directed preparation of, in particular, water-diluteable polymers.

The invention is described in greater detail in the example below. All indications of parts and percentages are by weight, unless expressly stated otherwise.

EXAMPLE

First step of the preparation process according to the invention (preparation of an intermediate)

1040 g (1 mol) of a polyester diol made from neopentyl glycol and adipic acid and having an OH number of 108 are weighed into a 3-liter four-neck flask fitted with stirrer, thermometer and reflux condenser, and are heated to 80° C. 152 g (1 mol) of tetrahydrophthalic anhydride are then added, and the mixture is stirred at 80° C. for 1 hour.

157 g of anhydrous methyl ethyl ketone are subsequently added, and the temperature is kept at 80° C. for a further hour. 222 g (1 mol) of isophorone diisocyanate are then added rapidly. As soon as the reaction mixture has become homogeneous, 1 g of dibutyltin dilaurate and 314 g of anhydrous methyl ethyl ketone are added, and the mixture is stirred at 80° C. until the NCO content is constant (1.8 to 2.1% by weight, theoretically 2.2% by weight).

Second step of the preparation process according to the invention (a preparation of a macromonomer)

200 g of di-trimethylolpropane (the amount employed depends on the NCO content of the intermediate; 1 mol of di-trimethylolpropane is employed per NCO equivalent) and 540 g of anhydrous methyl ethyl ketone are weighed into a 3-liter four-neck flask fitted with stirrer, thermometer and reflux condenser, and are heated to 80° C. while stirring. As soon as the di-trimethylolpropane has dissolved completely, 1885 g of the 1st product are added dropwise over the course of 2 hours via an inlet vessel. The mixture is then refluxed (at about 90° C.) until (about 2 hours) the NCO content has fallen to below 0.02% by weight. The mixture is finally concentrated to the solids content of 75% by weight by removing the methyl ethyl ketone by distillation.

We claim:

1. A process for the preparation of macromonomers which carry at least two hydroxyl groups at one end, which comprises
   (1) reacting a polyester, polyether, polyurethane, polyurea or polyamide prepolymer which has a number average molecular weight of 300 to 3000, and contains an average of one terminal hydroxyl or amino group and at least one carboxyl group per molecule, with a diisocyanate to form an intermediate which contains an average of one terminal isocyanate group and at least one carboxyl group per molecule, and; subsequently reacting this intermediate with a compound which has a molecular weight of 90 to 800, and contains at least two hydroxyl groups in addition to the group which is reactive to isocyanate groups, to form a macromonomer which carries an average of at least one carboxyl group and, at one end, at least two hydroxyl groups per molecule.

2. The process as claimed in claim 1, wherein the prepolymer employed is a polyester.

3. The process as claimed in claim 1, wherein the prepolymer employed is a prepolymer which contains an average of one terminal hydroxyl or amino group and one terminal carboxyl group per molecule.

4. The process as claimed in claim 1, wherein the prepolymer employed is a prepolymer which contains an average of one terminal hydroxyl and one terminal carboxyl group per molecule.

5. The process as claimed in claim 1, wherein the diisocyanate employed is a diisocyanate whose isocyanate groups are bound to (cyclo)aliphatic molecular fragments.

6. The process of claim 1 wherein the prepolymer has a number average molecular weight of 500 to 2000.

7. The process of claim 1 wherein the compound has a molecular weight of 120 to 300.

8. The process claim 6 wherein the compound has a molecular weight of 120 to 300.

9. The process as claimed in claim 1 wherein the prepolymer employed is a prepolymer which contains an average of one terminal hydroxyl or amino group and one terminal carboxyl group per molecule.

10. The process as claimed in claim 1 wherein the prepolymer employed is a prepolymer which contains an average of one terminal hydroxyl and one terminal carboxyl group per molecule.

11. The process as claimed in claim 1 wherein the diisocyanate is one whose isocyanate groups are bound to (cyclo) aliphatic molecular fragments.

12. A macromonomer which carries at least two hydroxyl groups at one end comprised of the reaction product of a polyester, polyether, polyurethane, polyurea or polyamide prepolymer which has a number average molecular weight of 300 to 3000 and contains an average of one terminal hydroxyl or amino group and at least one carboxyl group per molecule, and a diisocyanate which forms an intermediate containing an average of one terminal isocyanate group and at least one carboxyl group per molecule, which intermediate is reacted with a compound which has a molecular weight of 90 to 800 and contains at least two hydroxyl groups in addition to the group which is reactive to isocyanate groups, whereby a macromonomer is formed which carries an average of at least one carboxyl group and, at one end, at least two hydroxyl groups per molecule.

13. The macromonomer as claimed in claim 12, wherein the prepolymer has a number average molecular weight of 500 to 2000.

14. The macromonomer as claimed in claim 12, wherein the compound has a molecular weight of 120 to 300.

15. The macromonomer as claimed in claim 12, wherein the compound has a molecular weight of 120 to 300.

* * * * *